United States Patent [19]

Koski

[11] Patent Number: 4,802,955

[45] Date of Patent: Feb. 7, 1989

[54] DEWATERING BAND PRESS SIDE SEALS

[75] Inventor: Ilpo Koski, Pori, Finland

[73] Assignee: Rauma-Repola Oy, Pori, Finland

[21] Appl. No.: 117,636

[22] Filed: Nov. 5, 1987

[30] Foreign Application Priority Data

Nov. 5, 1986 [FI] Finland ................................ 864502

[51] Int. Cl.[4] ................................................ B01D 33/04

[52] U.S. Cl. .................................... 162/301; 100/118; 100/154; 162/358; 162/305; 210/401

[58] Field of Search ............... 162/300, 301, 303, 305, 162/331, 334, 353, 358, 360.1, 361; 100/118, 154, 153; 210/400, 401, 386, 450

[56] References Cited

U.S. PATENT DOCUMENTS 3,926,542 12/1975 Ahrweiler .......................... 100/151

4,544,061 10/1985 Crandall ............................ 210/386

4,544,447 10/1985 Pinter et al. ....................... 162/231

FOREIGN PATENT DOCUMENTS 3404422 10/1984 Fed. Rep. of Germany ...... 100/118

*Primary Examiner*—Kenneth M. Schor

*Assistant Examiner*—K. M. Hastings

*Attorney, Agent, or Firm*—Burns, Doane, Swecker & Mathis

[57] ABSTRACT

The invention concerns a dewatering band press. The wires (2) in the press are wider than the rolls (1), and in view of sealing the edge of the pulp web (3), two rails (4) are placed outside the ends of the rolls, the wires running between the said rails, and a sealing beam (5) is placed between the rails and the wires. The solution is durable and reliable, because it has no readily worn abrading parts.

2 Claims, 1 Drawing Sheet

DEWATERING BAND PRESS SIDE SEALS

BACKGROUND OF THE INVENTION

1. Field of the Invention

The present invention is concerned with a dewatering band press and in particular with the sealing of its edge. Dewatering band presses are used in particular in fibre-pulp industry for the dewatering of the pulp.

2. Description of Related Art

A dewatering band press comprises two wires which are pressed against each other by means of rolls over a certain distance. The pulp to be dewatered is fed as a continuous web between the wires. When the wires are pressed against each other, the pulp is compressed and water is drained through the wires. For supporting the wire, the press comprises several pairs of rolls.

In prior art the sealing of the edge of the pulp web is performed by means of an elastic seal of a length equal to the length of the web, placed between the wires at the proximity of the roll ends. At the same time as the wires are pressed by the rolls, the seal is pressed against the wires. The seal is supported from the side in a direction perpendicular to the direction of running of the web. The material of the seal is, e.g., rubber. Moreover, facing the seal, between the rolls, there are plates pressed against the outer faces of the wires, the said plates preventing the wire from bulging to between the rolls apart from the web.

Drawbacks of this sealing solution are complicated construction, deformations and poor resistance to wear of the elastic seal, and rapid wear of the parts owing to abrasion.

SUMMARY OF THE INVENTION

Thus, an object of the present invention is to provide a simpler, more reliable, and more durable sealing system for a dewatering band press.

In the solution now developed, wires wider than the rolls are used, and the edge of the pulp web is sealed from outside the roll ends.

In one embodiment, there are two rails parallel to the web, and a sealing beam between the rails, so that the wires run in the gap between the rails and the beam.

BRIEF DESCRIPTION OF THE DRAWINGS

A preferred embodiment of the invention will be described in the following in more detail. A drawing is related to the description, wherein.

DETAILED DESCRIPTION OF A PREFERRED EMBODIMENT

Figure 1:
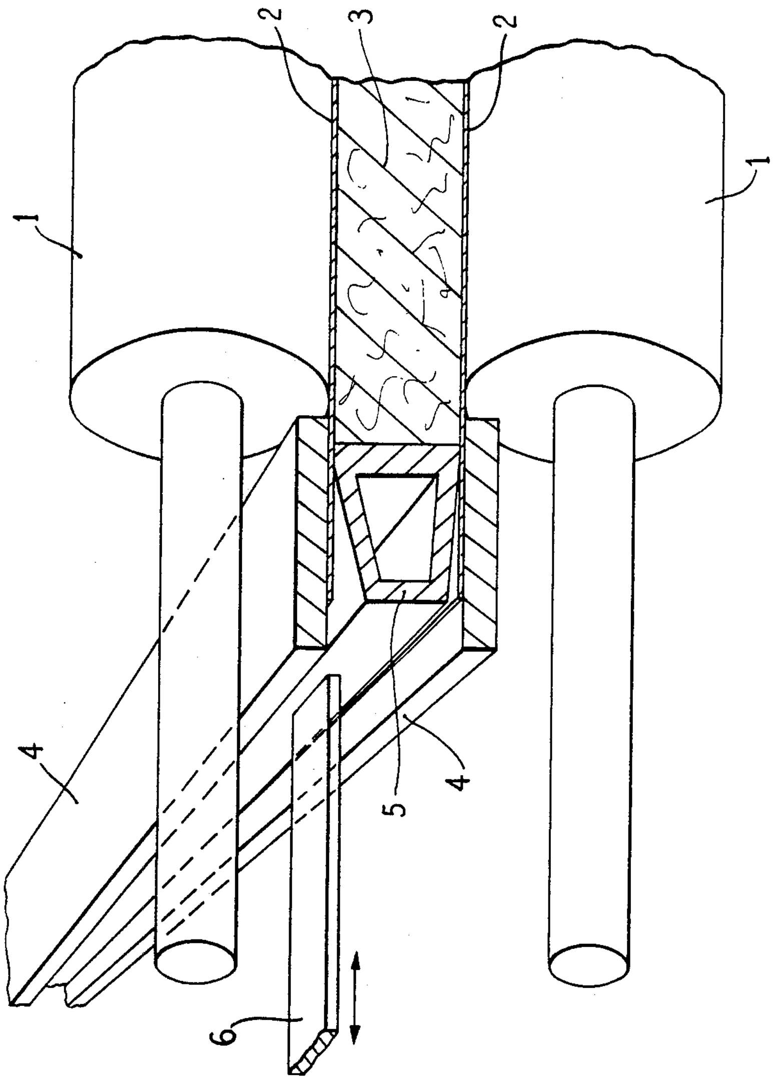
FIG. 1 shows the dewatering band press at the end of one pair of rolls.

The equipment includes a number of pairs of rolls 1, by means of which the wires 2 are pressed towards each other. Between the wires, a pulp web 3 moves along with the wires. The wires are somewhat wider than the rolls.

Immediately outside the ends of the rolls 1, at the side of the web and at the level of the web, there are two rails 4 parallel to the web, the spacing of said rails being the same as the spacing of the pair of rolls. Between the rails there is a sealing beam 5 parallel to the rails and of a thickness sufficient so that the wire 2 has space enough to run between the sealing beam and the corresponding rail. Preferably, a gap of a dimension exactly equal to the thickness of the wire remains between the beam and the rail.

The inner edge of the sealing beam 5 is preferably thicker than its outer edge. In this way the sealing point is formed exactly at the edge of the pulp web.

The equipment further includes regulating means 6 for the sealing beam 5, by means of which the sealing beam can be displaced in the plane of the web in a direction perpendicular to the direction of running of the web.

The rails 4 and the sealing beam 5 may be made of metal or of strong plastic, and an elastic abrasive seal is not needed. Since the sealing is performed outside the ends of the rolls, rubbing plates that support the wire between the rolls are not required.

The solution described above is durable and reliable, because it has no readily worn abrasive parts. Also, omission of rubbing parts lowers the power consumption of the wire drive motor by about ten to twenty percent.

What is claimed is:

1. A dewatering band press, comprising:

a pair of rolls having ends and a spacing between the rolls;

two wires extending between the pair of rolls and pressed together by said rolls so as to retain a material to be dewatered that is fed between the two wires so as to form a pulp web, said wires adapted to move between the pair of rolls in a run direction;

two rails placed outside the ends of the rolls, each of the rails being at a level of a respective one of the pair of rolls and extending in the run direction such that a spacing between the rails is substantially equal to the spacing between the pair of rolls;

the wires being wider than and extending beyond the ends of the rolls so as to extend between said rails;

a sealing beam located between the rails and the wires, the thickness of the sealing beam being substantially equal to the spacing between the rolls less a thickness of the wires.

2. The dewatering band press of claim 1, further comprising regulating means for displacing the sealing beam in a plane extending between the pair of rolls and in a direction perpendicular to the run direction.

* * * * *